United States Patent [19]

Zimmerman et al.

[11] Patent Number: 4,769,438

[45] Date of Patent: Sep. 6, 1988

[54] AMINATED PROPOXYLATED 1,4-BUTANEDIOL EPOXY RESIN ADDUCTS AS EPOXY RESIN CURATIVES

[75] Inventors: Robert L. Zimmerman; Harold G. Waddill; Kathy B. Sellstrom, all of Austin, Tex.

[73] Assignee: Texaco Inc., White Plains, N.Y.

[21] Appl. No.: 67,068

[22] Filed: Jun. 29, 1987

[51] Int. Cl.$^4$ .............................................. C08G 59/50
[52] U.S. Cl. .................................. 528/104; 525/504; 528/111; 528/407
[58] Field of Search ................ 525/504; 528/104, 111, 528/407; 564/505

[56] References Cited

U.S. PATENT DOCUMENTS

| | | | |
|---|---|---|---|
| 3,380,881 | 4/1968 | Williamson et al. | 528/111 X |
| 3,654,370 | 4/1972 | Yeakey | 564/505 X |
| 4,181,682 | 1/1980 | Watts et al. | 564/505 |
| 4,420,606 | 12/1983 | Waddill | 528/407 X |
| 4,421,906 | 12/1983 | Waddill et al. | 528/111 X |
| 4,423,170 | 12/1983 | Waddill | 528/111 X |
| 4,487,806 | 12/1984 | Sellstrom et al. | 528/104 X |
| 4,528,308 | 7/1985 | Waddill | 528/111 X |
| 4,528,345 | 7/1985 | Waddill | 528/407 X |
| 4,552,933 | 11/1985 | Sellstrom et al. | 524/590 X |

Primary Examiner—Earl Nielsen
Attorney, Agent, or Firm—Jack H. Park; Kenneth R. Priem; Richard A. Morgan

[57] ABSTRACT

Diamines of the formula:

$$H_2N(CH(CH_3)CH_2O)_xnC_4H_8OCH_2CH(CH_3)NH_2$$

are modified with 5 to 50 wt % of a diglycidyl ether of bisphenol A to form a prepolymer. When reacted with an epoxy resin, these modified diamines impart improved properties to the cured resin compared with the unmodified amine. Improved rate of cure and greater thermal shock resistance were achieved.

The cured resin products are useful for coatings, adhesives, encapsulations, laminates and composite fabrications.

10 Claims, No Drawings

AMINATED PROPOXYLATED 1,4-BUTANEDIOL EPOXY RESIN ADDUCTS AS EPOXY RESIN CURATIVES

BACKGROUND OF THE INVENTION

1. Field of the Invention

This invention relates to epoxy resin curing agents. These curing agents comprise aminated, propoxylated 1,4-butanediol which are reacted with small amounts of an epoxy resin.

These curing agents demonstrate improved properties when cured with an epoxy resin. The improved properties demonstrated by the cured products makes them useful in coatings, encapsulations, sealants, laminates and composite materials.

Publications in the Field of the Invention

Epoxy resins constitute a broad class of polymeric materials having a wide range of physical properties. The resins are characterized by epoxide groups which are cured by reaction with certain catalysts or curing agents to provide cured epoxy resin compositions with certain desirable properties.

The most common epoxy resins are a condensation product of epichlorohydrin and bisphenol A. This system can be cured with any of the conventional curing agents such as polyamines, polycarboxylic acids, anhydrides and Lewis acids. Bisphenol A based epoxy compositions when cured have good adhesive properties but many are inherently stiff and brittle and hence their use is limited to applications where peel forces do not come into play.

It has been found that plasticizers can be added to an epoxy resin adhesive system to improve flexural strength. Typical methods of plasticization include the addition of flexibilizing aliphatic amines to the curing agent addition of aminated or carboxylated rubbers to the system, addition of carboxy-terminated polyesters, addition of organic hydroxyl containing compounds and the addition of epoxidized oils.

In H. N. Vazirani *Adhesives Age* 23, No. 10, p. 31 is described reaction products of liquid epoxy resins with a polyoxypropylene diamine which are useful in flexibilizing adhesive systems.

It is well known in the art that there is a need for an epoxy system that will produce a flexible cured resin with good adhesive properties.

A process for preparing polyoxyalkylene polyamines is described in U.S. Pat. No. 3,654,370 to Yeakey. This patent describes curing agents for epoxy resins of the formula

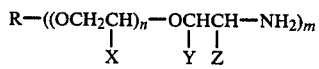

wherein R is the nucleus of an oxyalkylation-susceptible polyhydric alcohol containing 2 to 12 carbon atoms and 2 to 8 hydroxyl groups, Z is an alkyl group containing 1–18 carbon atoms, X and Y are hydrogen or Z, n has an average value of 0 to 50 and m is an integer of 2 to 8 corresponding to the number of hydroxyl groups in the polyhydric alcohol.

U.S. Pat. No. 3,236,895 to J. M. Lee and J. C. Winfrey and U.S. Pat. No. 3,462,393 to Legler are pioneer patents. They describe a series of amine compounds which are solids or liquids and have utility particularly in curing epoxy resins. The amine compounds have the general formula:

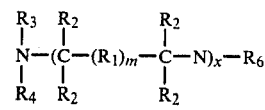

wherein R's are selectively defined as hydrogen, alkyl radicals and alkylene oxide radicals and x and m are defined integers.

U.S. Pat. No. 4,420,606 to H. G. Waddill describes a series of one component water reduced epoxy adhesives. These comprise a polyepoxide which has been reacted with from 50 wt % to 70 wt % of a polyoxyalkylene monoamine or diamine and a curative agent. Example II demonstrates diamines based on polyoxypropylene rather than 1,4-butanediol of the instant invention, modified with 0 to 40 pbw epoxy resin. The cured products were tested for their properties as flexible adhesives.

U.S. Pat. No. 4,421,906 to H. G. Waddill and K. B. Sellstrom describes a water-based epoxy resin coating composition. The composition comprises a bisphenol A type resin or derivative which has been partially reacted with a polyoxyalkyleneamine, e.g. a polyoxypropylene diamine. Example IIa demonstrates diglycidyl ethers of bisphenol (EEW~185) modified with 5 to 30 parts of polyoxypropylene diamines. Cured resins were tested for their properties as coatings.

U.S. Pat. No. 4,487,806 to K. B. Sellstrom and H. G. Waddill describes a non-yellowing epoxy resin aggregate binder formulation. The formulation comprises a curing agent comprising a polyoxypropylene diamine, nonylphenol and m-xylene diamine.

U.S. Pat. No. 4,552,933 to K. B. Sellstrom and H. G. Waddill describes an amine curing agent comprising a solution of normally solid cured polyurethane elastomer in a 1,2-epoxy-interactive polyamine curing agent, whereby reaction of the amine hydrogens of the polyamine with the epoxy groups in the epoxy resin will result in curing of the epoxy resin. U.S. Pat. No. 4,574,143 in a continuation-in-part describes epoxy curing agents prepared by extending an amine-type curing agent with polyethylene terephthalate. U.S. Pat. No. 4,578,412 in a divisional application describes epoxy resin curatives comprising a solution of cured elastomeric polyurethane formed by reaction injection molding.

U.S. Pat. No. 4,528,345 describes weather resistant epoxy coatings using cycloaliphatic diepoxy resins. The method comprises prereacting these cycloaliphatic diepoxy resins with aminoethylpiperazine and then combining the reaction product with a curing amount of polyoxyalkylene polyamine and an accelerator.

U.S. Pat. No. 4,110,310 to H. Schulze and H. G. Waddill describes an epoxy resin composition comprising a vicinal polyepoxide, a curing amount of an amine curing agent and an effective amount of a polyether diamide having terminal amido groups. U.S. Pat. No. 4,113,697 by these inventors describes anhydride cured epoxy resins. The physical properties of these cured resins are enhanced by addition of polyether diamide additives.

U.S. Pat. No. 4,181,682 to L. W. Watts, Jr. and H. G. Waddill discloses aminated, propoxylated polybutanediols. These polymers are useful as epoxy curing agents.

U.S. Pat. No. 4,124,758 to L. W. Watts, Jr. and E. L. Yeakey describes aminated cellulose derivatives prepared by reductive amination of a hydroxyalkyl cellulose. U.S. Pat. No. 4,139,698 to L. W. Watts, Jr. describes aminated starch derivatives prepared by the reductive amination of an oxidized starch by reaction with ammonia or ammonium hydroxide.

U.S. Pat. No. 4,423,170 to H. G. Waddill discloses a one component water-based epoxy resin comprising a modified diepoxide with a latent curative in aqueous medium. The diepoxide is modified by partial reaction with a polyoxyalkyleneamine containing variable amounts of ethylene oxide.

SUMMARY OF THE INVENTION

The invention is an epoxy resin curing agent comprising a diamine of the formula:

H$_2$N(CH(CH$_3$)CH$_2$O)$_x$—nC$_4$H$_8$OCH$_2$CH(CH$_3$)NH$_2$ wherein x ranges from 0 to 2. The diamine is modified with from 5 wt % to 50 wt %, preferably 10 wt % to 30 wt % of a vicinal polyepoxide having an average of at least 1.8 reactive 1,2-epoxy groups per molecule.

The modified diamines demonstrate increased rate of cure and greater thermal shock resistance compared with the unmodified diamines when cured with epoxy resin.

DESCRIPTION OF THE PREFERRED EMBODIMENTS

U.S. Pat. No. 3,654,370 to Yeakey incorporated herein by reference describes a process for preparing polyoxyalkylene polyamines of the formula:

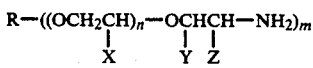

R—((OCH$_2$CH)$_n$—OCHCH—NH$_2$)$_m$
         |         |   |
         X         Y   Z wherein R is the nucleus of an oxyalkylation susceptible polyhydric alcohol containing 2 to 12 carbon atoms and 2 to 8 hydroxyl groups, Z is an alkyl group containing 1 to 18 carbon atoms, X and Y are hydrogen or Z, n has an average value of 0 to 50 and m is an integer of 2 to 8 corresponding to the number of hydroxyl groups in the polyhydric alcohol.

It can be seen in the formula that if R is a 1,4 butylene radical, Y is hydrogen, Z is methyl, n is zero and m is two, the product is a propoxylated 1,4-butanediol diamine precursor of the instant epoxy resin adducts.

It is also known from the prior art that glycols can be symmetrically capped with a small amount of propylene oxide by means of tetramethyl or tetraethyl ammonium hydroxide catalyst at a first temperature of 80° C. to 110° C. at a pressure sufficient to maintain the propylene oxide in the liquid phase and a time sufficient to react the propylene oxide and then at a second temperature of 125° C. to 150° C. for a period of time sufficient to dissociate the catalyst. (Asahi Glass Co., Ltd., Japan Kokai Tokkyo-Koho 81/38,323). Example 1 of U.S. patent application Ser. No. 855,556 filed Apr. 25, 1986, now abandoned (incorporated herein by reference) shows that on a similar precursor about 8% of the one molar, 57% of the two molar, 25% of the three molar and 4% of the four molar propoxylate were formed by means of an alkyl ammonium hydroxide catalyst. The other precursors are thereby synthesized.

The propoxylated 1,4-butylene radical is symmetrically aminated by means of Raney nickel catalyst, promoted Raney nickel or the nickel, copper, chromium catalyst of U.S. Pat. No. 3,654,370 to Yeakey.

The aminated propoxylated 1,4-butanediol is then reacted with 5 wt % to 50 wt %, preferably 10 wt % to 30 wt % of a vicinal polyepoxide having an average of at least 1.8 reactive 1,2-epoxy groups per molecule.

These polyepoxide materials can be monomeric or polymeric, saturated or unsaturated, aliphatic, cycloaliphatic, aromatic or heterocyclic, and may be substituted if desired with other substituents besides the epoxy groups, e.g., hydroxyl groups, ether radicals, aromatic halogen atoms and the like. These vicinal polyepoxide containing compounds typically are of an epoxy equivalent weight of 150 to 250. Preferably the base resin, which has an epoxide equivalent weight of from 175 to 195, is derived from condensing epichlorohydrin with 2,2-bis(p-hydroxyphenyl propane) to form 2,2-bis[(p-2,3 epoxy propoxy) phenyl] propane, a derivative of bisphenol A.

The structure for the condensation product of epichlorohydrin and bisphenol A in a preferred embodiment of the present invention is:

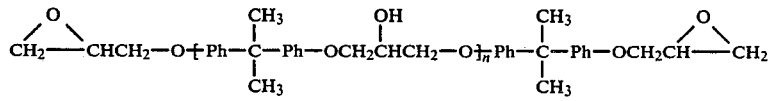

wherein Ph is phenylene and n is an integer such that the molecular weight of the diepoxide averages 350 to 400.

Preferred polyepoxides are those of glycidyl ethers prepared by epoxidizing the corresponding allyl ethers or reacting, by known procedures, a molar excess of epichlorohydrin and an aromatic polyhydroxy compound, i.e., isopropylidene bisphenol, novolac, resorcinol, derivatives of aromatic amines, etc. The epoxy derivatives of methylene or isopropylidene bisphenols are especially preferred.

A widely used class of polyepoxides which are useful according to the present invention includes the resinous epoxy polyethers obtained by reacting an epihalohydrin, such as epichlorohydrin, and the like, with either a polyhydric phenol or a polyhydric alcohol. Typically the epoxy resins have an average of at least 1.8 reactive, 1,2-epoxy groups per molecule. An illustrative, but by no means exhaustive, listing of suitable dihydric phenols includes 4,4'-isopropylidene bisphenol, 2,4'-dihydroxydiphenylethylmethane, 3-3'-dihydroxydiphenyldiethylmethane, 3,4'-dihydroxydiphenylmethylpropylmethane, 2,3'-dihydroxydiphenylethylphenylmethane, 4,4'-dihydroxydiphenylpropylphenylmethane, 4,4-dihydroxydiphenylbutylphenylmethane, 2,2'-dihydroxydiphenylditolylmethane, 4,4'-dihydroxydiphenyltolylmethylmethane and the like. Other polyhydric phenols which may also be co-reacted with an epihalohydrin to provide these epoxy polyethers are such compounds as resorcinol, hydroquinone, substituted hydroquinones, e.g., methylhydroquinone, and the like.

Among the polyhydric alcohols which can be co-reacted with an epihalohydrin to provide these resinous epoxy polyethers are such compounds as ethylene glycol, propylene glycols, butylene glycols, pentane diols, bis(4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyhydric thioethers, such as 2,2'-, 3,3'-tetrahydroxydipropylsulfide and the like, mercapto alcohols such as monothioglycerol, dithioglycerol and the like, polyhydric alcohol partial esters, such as monostearin, pentaerythritol monoacetate and the like, and halogenated polyhydric alcohols such as the monochlorohydrins of glycerol, sorbitol, pentaerythritol and the like.

Another class of polymeric polyepoxides which can be amine cured and are in accordance with the present invention includes the epoxy novolac resins obtained by reacting, preferably in the presence of a basic catalyst, e.g., sodium or potassium hydroxide, an epihalohydrin, such as epichlorohydrin, with the resinous condensate of an aldehyde, e.g., formaldehyde, and either a monohydric phenol, e.g., phenol itself, or a polyhydric phenol. Further details concerning the nature and preparation of these epoxy novolac resins can be obtained in Lee, H. and Neville, K., *Handbook of Epoxy Resins*, McGraw Hill Book Co., New York, 1967.

Modified curative which comprise more than 50 wt % epoxy resin demonstrate less flexibility and high viscosity. Modified curative which contains less than 5 wt % demonstrate lowered adhesive strength and decreased viscosity in solutions. Flexibility and viscosity are most beneficially balanced when from about 10 wt % to about 30 wt % of epoxy resin are reacted with the diamine.

Epoxy base resin, modified curative and optionally an accelerator are mixed immediately prior to use and applied directly to the surface prior to curing.

The curative agent is usually added to the formulation in such an amount that there is one reactive NH group in the curing component for each epoxy group in the epoxy resin component. These are known as stoichiometric quantities. The stoichiometric quantity can be calculated from the knowledge of the chemical structure and analytical data on the component.

Stoichiometry unfortunately is not always calculatable. This is especially true with many latent systems. For latent systems, the proper amount of curative to provide best properties must be determined experimentally.

For the purposes of the present invention, the stoichiometric amount of curative agent is calculated by adding together the number of equivalents on the basis of weight percent replaceable NH groups. In general, it is advantageous to use up the 10% excess of the curative agent over the stoichiometric amount.

With many curatives, curing may be accomplished at ambient conditions. For development of optimum achieveable properties, however, curing at elevated temperature is necessary. The curing temperature range acceptable in this invention is from about 80° C. to about 180° C. for about 1 to 3 hours. Preferably curing is done at about 150° C. for 1 to 2 hours.

Optionally, the epoxy resin formulations of the present invention can include an accelerator to speed the amine cure of the epoxy resin. In several applications, an accelerator is beneficial, especially when an epoxy resin is used as an adhesive in flammable environment, thus making prolonged elevated temperature cure inconvenient or even hazardous.

U.S. Pat. No. 3,875,072 to H. G. Waddill incorporated herein by reference describes an accelerator comprising piperazine and an alkanolamine in a weight ratio of about 1:8 to about 1:1. The accelerator is particularly suited for accelerating the cure of a polyglycidyl ether of a polyhydric phenol cured a polyoxyalkylenepolyamine.

The invention is shown by way of example.

EXAMPLES

Preparation of Amine

To a tubular reactor filled with a nickel oxide-chromium oxide-copper oxide catalyst were fed hydrogen, ammonia, and a polyol made by adding 2.3 moles propylene oxide to 1,4-butanediol. The reactor was kept at 200° C. and 2000 psig. The crude reactor effluent was stripped at 100° C. and 8 mm Hg vacuum for 2 hours. The resulting amine had a total acetylatable content of 8.88 meq/g total amine, 8.49 meq/g and primary amine of 8.09 meq/g.

An amine synthesized according to this method is designated Amin. Propox. 1,4-Butanediol in the Examples.

In the Examples, the liquid epoxy resin of epoxy equivalent weight 185 was Epon ® 828, a diglycidyl ether of bisphenol A.

EXAMPLE 1

EXAMPLE 1

| Coatings Properties - Curing an Epoxy Resin with Aminated Propoxylated 1,4-Butanediol and Adducts of the Diamine | | | | |
|---|---|---|---|---|
| Formulation, pbw | 1-A | 1-B | 1-C | 1-D |
| Liquid epoxy resin (EEW~185) | 100 | 100 | 100 | 100 |
| Amin. Propox. 1,4-Butanediol | 30 | — | — | — |
| Adduct I (1) | — | 34 | — | — |
| Adduct II (2) | — | — | 38 | — |
| Adduct III (3) | — | — | — | 43 |
| Coating Properties Drying time, 6-mil film | | | | |
| set to touch, hrs. | 8.8 | 6.4 | 5.9 | 6.4 |
| surface dry, hrs. | 17.7 | 11.4 | 10.8 | 9.5 |
| thru dry, hrs. | 21.2 (4) | — | — | — |
| Pencil hardness after | | | | |
| 24 hours, ~25° C. | >3B | F | H | F |
| 7 days, ~25° C. | F-H (5) | F | H | F |
| 24 hours, ~25° C. + 1 hr. 125° C. | F | 2H | H | H |
| Gardner impact, in-lb to fail after 24 hours, | | | | |
| ~25° C. | 16/<4 | 20/<4 | 32/<4 | 36/<4 |
| (dir/rev) 7 days, ~25° C. | 16/<4 | 16/<4 | 20/<4 | 60/8 |
| 24 hours, ~25° C. + 1 hr. 125° C. | 16/<4 | 52/<4 | 160/40 | 20/12 |

(1) Reaction product of amine (100 pbw) with liquid epoxy resin (10 pbw)
(2) Reaction product of amine (100 pbw) with liquid epoxy resin (20 pbw)
(3) Reaction product of amine (100 pbw) with liquid epoxy resin (30 pbw)
(4) Tacky, undercured surface
(5) Slightly tacky surface
Considerable improvements in coating properties were found through the use of adducts of amine with epoxy resin. The undercured, soft, tacky coating surface which developed with the unmodified amine did not form with adducts of the amine. Curing was appreciably faster with the adducts.

EXAMPLE 2

Physical Properties: Curing with Aminated Propoxylated 1,4-Butanediol and Adducts

| Formulation, pbw | 2-A | 2-B | 2-C | 2-D |
|---|---|---|---|---|
| Liquid epoxy resin (EEW~185) | 100 | 100 | 100 | 100 |
| Amin. Propox. 1,4-Butanediol | 30 | — | — | — |
| Adduct I (1) | — | 34 | — | — |
| Adduct II (2) | — | — | 38 | — |
| Adduct III (3) | — | — | — | 43 |
| Properties of cured ⅛-inch castings cured overnight at ~25° C., 2 hrs. 80° C., 3 hrs. 125° C. | | | | |
| Izod impact strength, ft-lb/in. | 0.15 | 0.11 | 0.11 | 0.09 |
| Tensile strength, psi | 9600 | 9400 | 9300 | 9500 |
| Tensile modulus, psi | 386000 | 345000 | 349000 | 341000 |
| Elongation at break, % | 6.3 | 7.4 | 6.3 | 6.0 |
| Flexural strength, psi | 15600 | 16100 | 16200 | 16400 |
| Flexural modulus, psi | 423000 | 391000 | 386000 | 378000 |
| HDT, °C., 264 psi/66 psi | 75/76 | 72/78 | 76/81 | 73/78 |
| Shore D hardness, 0–10 sec. | 68-65 | 69-66 | 68-66 | 69-67 |
| % Wt gain, | | | | |
| 24-hour water boil | 3.0 | 2.6 | 2.6 | 2.6 |
| 3-hour acetone boil | 7.7 | 6.9 | 7.2 | 6.7 |
| Adhesive Properties cured overnight at ~25° C., 1 hr. 125° C. | | | | |
| Tensile shear strength, psi | 3900 | 4500 | 3900 | 3900 |
| T-peel, pli | 3.6 | 3.2 | 2.7 | 3.6 |

(1) Reaction product of amine (100 pbw) with liquid epoxy resin (10 pbw)
(2) Reaction product of amine (100 pbw) with liquid epoxy resin (20 pbw)
(3) Reaction product of amine (100 pbw) with liquid epoxy resin (30 pbw)

Physical properties of epoxy cured with adducts were of equivalent value or exceeded those cured with unmodified amine.

EXAMPLE 3

Curing Characteristics with Aminated Propoxylated 1,4-Butanediol and Adducts

| Formulation, pbw | 3-A | 3-B | 3-C | 3-D |
|---|---|---|---|---|
| Liquid epoxy resin (EEW~185) | 100 | 100 | 100 | 100 |
| Amin. Propox. 1,4-Butanediol | 30 | — | — | — |
| Adduct I (1) | — | 34 | — | — |
| Adduct II (2) | — | — | 38 | — |
| Adduct III (3) | — | — | — | 43 |
| Exothermic Properties | | | | |
| Gel time, mins. (200 g mass) | 295.0 | 292.3 | 276.0 | 215.0 |
| Peak exothermic temp., °C. | 124.0 | 108.8 | 73.2 | 94.2 |
| Time to peak temp., mins. | 330.0 | 342.0 | 337.0 | 255.0 |

(1) Reaction product of amine (100 pbw) with liquid epoxy resin (10 pbw)
(2) Reaction product of amine (100 pbw) with liquid epoxy resin (20 pbw)
(3) Reaction product of amine (100 pbw) with liquid epoxy resin (30 pbw)

There was only a small decrease in gellation time comparing the amine with the adduct containing the least amount of epoxy resin. More pronounced decreases were seen with adducts containing larger amounts of epoxy resin. Exotherms also decreased with adducts containing larger amounts of epoxy resin.

EXAMPLE 4

Water Sensitivity of Epoxy Systems Cured with Aminated Propoxylated 1,4-Butanediol and Adducts

| Formulation, pbw | 4-A | 4-B | 4-C | 4-D |
|---|---|---|---|---|
| Liquid epoxy resin (EEW~185) | 100 | 100 | 100 | 100 |
| Amin. Propox. 1,4-Butanediol | 30 | — | — | — |
| Adduct I (1) | — | 34 | — | — |
| Adduct II (2) | — | — | 38 | — |
| Adduct III (3) | — | — | — | 43 |
| Properties (4) | | | | |
| % wt. gain, | | | | |
| 2-week water immersion | 2.40 | 2.26 | 2.36 | 2.36 |
| 4-week water immersion | 2.50 | 2.45 | 2.49 | 2.45 |
| Flexural strength, psi | | | | |
| Control | 15300 | 17400 | 15100 | 15000 |
| After 4-week water immersion | 13100 | 14600 | 12300 | 11700 |
| Flexural modulus, psi | | | | |
| Control | 391000 | 452000 | 410000 | 402000 |
| After 4-week water | 333000 | 334000 | 334000 | 334000 |

(1) Reaction product of amine (100 pbw) with liquid epoxy resin (10 pbw)
(2) Reaction product of amine (100 pbw) with liquid epoxy resin (20 pbw)
(3) Reaction product of amine (100 pbw) with liquid epoxy resin (30 pbw)
(4) Cured 2 hours, 80° C.; 3 hours, 125° C. Immersed in distilled water at 60° C. Weighed after 2 and 4 weeks. Flexural strength and modulus determined immediately after removal from water after 4-week immersion.

Although degree of flexural strength retention after water immersion varied among the four systems, little difference in final properties was noted between the unmodified system and the modified systems.

EXAMPLE 5

Thermal Shock Properties with Aminated Propoxylated 1,4-Butanediol and Adducts

| Formulation, pbw | 5-A | 5-B | 5-C | 5-D |
|---|---|---|---|---|
| Liquid epoxy resin (EEW~185) | 100 | 100 | 100 | 100 |
| Amin. Propox. 1,4-Butanediol | 30 | — | — | — |
| Adduct I (1) | — | 34 | — | — |
| Adduct II (2) | — | — | 38 | — |
| Adduct III (3) | — | — | — | 43 |

(1) Reaction product of amine (100 pbw) with liquid epoxy resin (10 pbw)
(2) Reaction product of amine (100 pbw) with liquid epoxy resin (20 pbw)
(3) Reaction product of amine (100 pbw) with liquid epoxy resin (30 pbw)

Thermal shock samples were prepared by pouring ~35 g of the degassed liquid epoxy system over a 1-inch common washer resting on a ¼-inch paper ring (cut from extraction thimble) in an aluminum weighing dish. Samples were cured overnight at ~25° C., 2 hours at 80° C., 3 hours at 125° C.

Thermal Cycles
30 minutes in oven at 140° C.
15 minutes in dry ice/acetone bath at −20° C.
15 minutes at ~25° C.

Samples were checked for cracking at the end of each three-part cycle. Uncracked samples were recycled to the oven for further testing.

Number of Samples Cracked During Each Cycle

| Formulation | 1 | 2 | 3 | 4 | 5 | 6 | 7 | 8 | 9 | 10 | Total |
|---|---|---|---|---|---|---|---|---|---|---|---|
| 5-A | 4 | 1 | 0 | 0 | 0 | 0 | 0 | 0 | 1 | 0 | 6 |
| 5-B | 1 | 0 | 0 | 0 | 1 | 0 | 0 | 0 | 0 | 0 | 2 |
| 5-C | 2 | 0 | 0 | 1 | 0 | 0 | 1 | 0 | 0 | 0 | 4 |
| 5-D | 1 | 1 | 0 | 0 | 0 | 0 | 0 | 0 | 0 | 0 | 2 |

An epoxy resin cured with the adducted amines had thermal shock resistance superior to that of the resin cured with the unmodified amine.

Table of Test Methods

| | |
|---|---|
| Gel Time (minutes) | ASTM D-2471-71 |
| Pencil hardness (cure) | ASTM D-3363-74 |
| Gardner impact | ASTM D-2794-69 |
| Gloss | ASTM D-523 |
| Crosshatch adhesion (%) | ASTM D-3359-74 |
| Shore D-Hardness 0–10 seconds | ASTM D-2240 |
| Elongation at Break (%) | ASTM D-638 |
| Heat Deflection Temperature (HDT) (°C., 264 psi/66 psi) | ASTM D-648 |
| Izod Impact Strength (ft lbs/in) | ASTM D-256 |
| Tensile strength (psi) | ASTM D-638 |
| Tensile Modulus (psi) | ASTM D-638 |
| Flexural Strength (psi) | ASTM D-790 |
| Flexural Modulus (psi) | ASTM D-790 |
| Compression Strength at Yield; at Failure (psi) | ASTM D-695 |
| T-peel strength (pli) | ASTM D-1876 |

| Table of Test Methods | |
|---|---|
| Tensile shear strength (psi) | ASTM D-1002 |

While particular embodiments of the invention have been described, it is well understood that the invention is not limited thereto since modifications may be made. It is therefore contemplated to cover by the appended claims any such modifications as fall within the spirit and scope of the claims.

What is claimed is:

1. An epoxy resin curing agent comprising a diamine of the formula:

$$H_2N(CH(CH_3)CH_2O)_xCH_2CH_2CH_2CH_2OCH_2CH(CH_3)NH_2$$

wherein x ranges from 0 to 2, which diamine has been reacted with from 5 wt % to 50 wt % of a vicinal polyepoxide of at least 1.8 reactive 1,2-epoxy groups per molecule.

2. The curing agent of claim 1 wherein the amount of polyepoxide is 10 wt % to 30 wt %.

3. The curing agent of claim 1 wherein the polyepoxide is of equivalent weight 170 to 220.

4. The curing agent of claim 1 wherein the polyepoxide is of equivalent weight 184 to 192.

5. The curing agen of claim 1 wherein the polyepoxide is a diglycidyl ether of bisphenol A.

6. An epoxy resin composition comprising the cured reaction product of:

a. A diamine of the formula:

$$H_2N(CH(CH_3)CH_2O)_xCH_2CH_2CH_2CH_2OCH_2CH(CH_3)NH_2$$

wherein x ranges from 0 to 2, which diamine has been reacted with from 5 wt % to 50 wt % of a vicinal polyepoxide of at least 1.8 reactive 1,2-epoxy groups per molecule, and b. a liquid epoxy resin.

7. The composition of claim 6 wherein the amount of polyepoxide is 10 wt % to 30 wt %.

8. The composition of claim 6 wherein the polyepoxide is of equivalent weight 170 to 220.

9. The composition of claim 6 wherein the polyepoxide is of equivalent weight 184 to 192.

10. The composition of claim 6 wherein the polyepoxide is a dyglycidyl ether of bisphenol A.

* * * * *